June 10, 1952 R. W. WAGNER 2,600,347
POWER TAKEOFF
Filed June 5, 1948
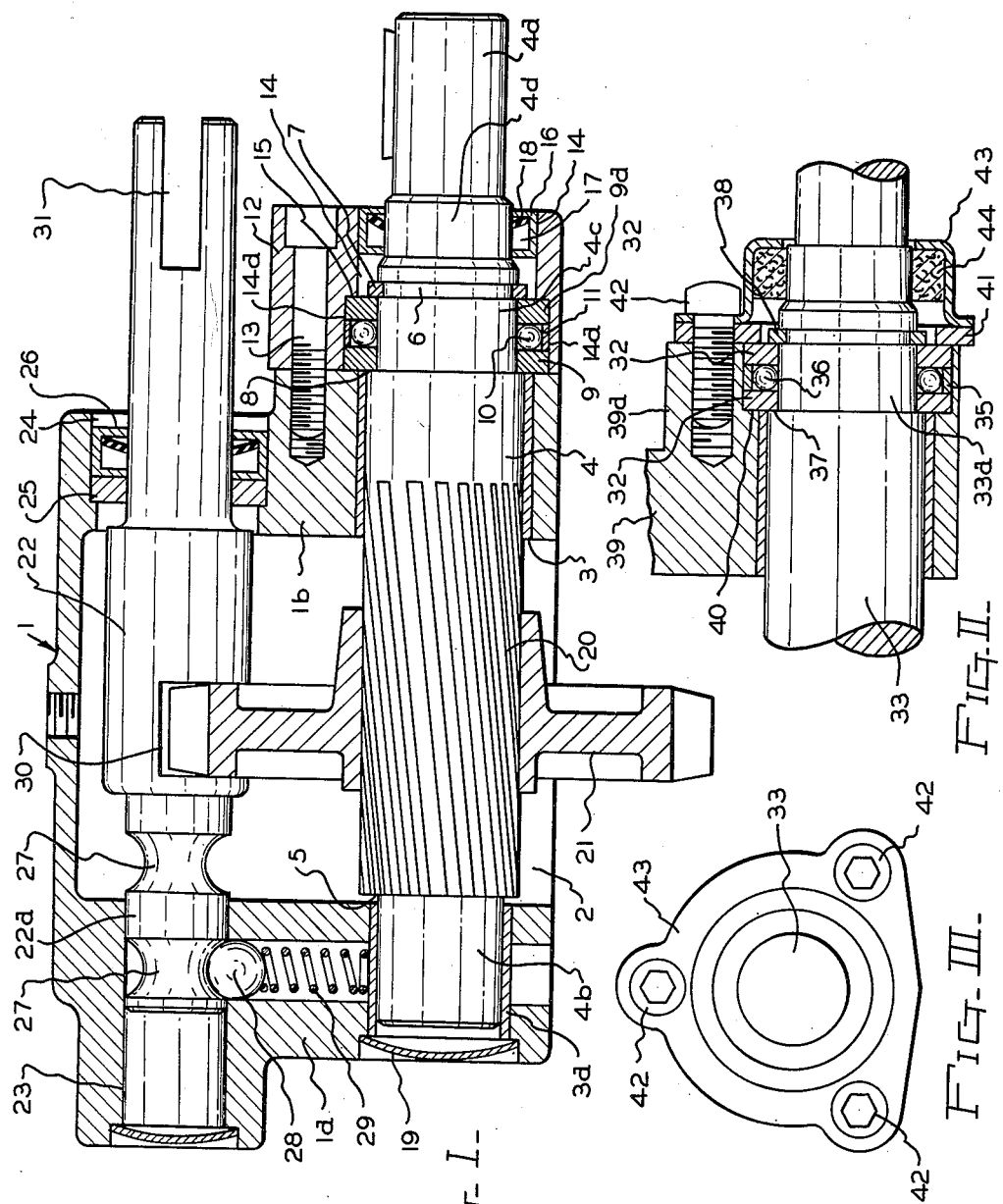
Inventor
ROBERT W. WAGNER
By Beaman & Patch
ATTORNEY Patented June 10, 1952

2,600,347

UNITED STATES PATENT OFFICE 2,600,347

POWER TAKEOFF

Robert W. Wagner, Chelsea, Mich.

Application June 5, 1948, Serial No. 31,276

1 Claim. (Cl. 74—15.86)

This invention relates to power take-off apparatus, as employed on automobiles or other motor driven vehicles, such as farm or road tractors, to provide a readily and conveniently available source of power for actuating apparatus external to the motor or like vehicle and which power take-off apparatus is adopted for operative connection with the transmission gearing of the motor vehicle.

In connection with such transmission gears, whereas the same normally involve spur gearing it sometimes happens that helical gearing is encountered, thereby introducing a problem into the installing of the conventional power take-off apparatus. This normally involves a power take-off shaft having a spur gear for operative connection with a motor vehicle transmission and when required for use in connection with a transmission having a helical gearing it has been proposed to modify this power take-off apparatus by the inclusion of one or more counter-shafts with an associated gear train to permit the transfer of the driving motion from the helical gear to the spur gear of the power take-off. This arrangement introduces undesirable complications as to the increased bulk, and cost of the modified power take-off apparatus.

It will be appreciated, of course, that to conform with requirements the power take-off apparatus as a whole must be relatively small, compared with the main gear transmission and in order that a power take-off may be designed to take the drive therefor direct from a helical gear of such transmission it is necessary to take into account the fact that the power take-off casing offers limited space in which the requisite axial thrust bearings can be installed to withstand the thrusts imposed upon the power take-off gear when in operation. It is probably due to this that the prior designers of power take-offs for use with helical gear transmissions have resorted to the use of larger than usual casings and undesirably complicated and expensive gear conversion trains.

It is the object of the present invention to provide a power take-off apparatus having a power take-off shaft carrying a helical gear for meshing directly with a helical gear transmission and to provide a compact yet efficient construction and arrangement of axial thrust bearing for the power take-off shaft which permits the use of this direct helical gear connection with the use of the minimum and standard size power take-off casing.

Thus, in accordance with the invention a power take-off apparatus is provided wherein the standard casing supports a power take-off shaft carrying a helical gear mounted upon a splined portion of the shaft and the latter is supported against axial thrust, exerted in the operative rotation of the helical gear in either direction, by the shaft being mounted in the casing through the medium of a two-direction thrust bearing, itself incorporated in one end wall of the casing in a compact and efficient manner.

Two practical applications and embodiments of the invention are shown in the accompanying drawings, by way of example, and in which:

Fig. I is a longitudinal sectional view of the one embodiment,

Fig. II is a fragmentary sectional view showing an alternative and preferred construction and arrangement for mounting the two-direction thrust bearing, and Fig. III is a right-hand end view of Fig. II.

Referring to the drawings and first to Fig. I, a power take-off apparatus is shown comprising a hollow casing indicated generally at 1, having opposite end walls 1a and 1b and having one side thereof formed with an opening 2.

The casing end walls 1a, 1b have opposed bearing bushings or liner sleeves 3 and 3a in which the power take-off shaft 4 is rotatably mounted to extend transversely across the casing interior and to provide an exterior extension 4a from the casing side wall 1b, which shaft extension 4a is therefore readily available for the making of the required driving connection from the take-off shaft, as is usual with power take-off apparatus.

The shaft 4 has a reduced end portion 4b mounted in the bearing liner 3a and forming a radial shoulder 5 on the shaft by which shoulder the required location of the shaft with respect to this liner is obtained and at its opposite end the shaft 4 has a further reduced portion 4c having itself (the reduced portion) an annular groove 6 in which a spring locking ring 7 is located to extend outwardly beyond the shaft portion 4c.

This locking ring 7, therefore, forms in effect, with the shaft shoulder 8, an annular groove which is utilized to accommodate the inner peripheral portions of an adjacent pair of thrust rings 9 and 9a which are axially separated by a spacing ring 11, to include between them the ball bearing members 10.

There is thus provided an exceedingly compact and efficient two-direction thrust bearing for the power take-off shaft 4, which bearing is held in position upon the one casing end wall 1b by an end socket part 12 secured to the outside of the casing end wall 1b in any convenient manner, as by a series of screwed studs 13 (one of which is shown in Fig. I).

The socket part 12 has a through-way bore 14 for the passage of the shaft portion 4c and at its inner end 14a this bore is of increased diameter and forms a radial shoulder 15 which abuts the outer thrust ring 9a, in the secured condition of the socket part 12, whereby axially to locate the shaft 4 upon the casing 1. It will be noted that the outer portion of the bore 14 is of greater diameter than that of the corresponding shaft portion, including the shaft portion 4d about which a dust or dirt excluder ring 16 is mounted, this ring having an interior annulus 17 in which a flexible wiper ring 18 is secured for engagement with the shaft portion 4d to form a dust or dirt excluder.

The entire arrangement is neat and compact and provides for the ready yet efficient mounting of the parts in position, whereas by removing the studs 13 the socket part 12 can be removed to permit access to be had to the split ring 14 and for the removal thereof, and hence of the shaft 4 and thrust bearing, which can then be withdrawn axially from the casing end wall 1b.

The bore in the casing end wall 1a containing the bearing liner 3a is conveniently closed, upon assembly of the parts, by the sprung-in disc 19.

The power take-off shaft 4 is provided with a helical splined portion 20 upon which a helical gear 21 is mounted for axial adjustment upon the said splined portion by the actuation of the axially shiftable bar 22.

This shifter bar 22 is mounted in parallel relationship with respect to the power take-off shaft 4 and is supported for axial adjustment upon the casing end walls 1a, 1b by the former said wall having a bore 23 slidably receiving the reduced bar end portion 22a and by the outer end wall 1b having an enlarged bore 24 in which a combined ring bearing 25 and sealing ring 26 (similar to the aforesaid ring 16) are secured for the slidable mounting of this end of the shifter bar 22. The latter has axially spaced annular grooves 27 at its one end with either of which a ball 28 spring biased by the coil spring 29 is engageable to give two possible indexed positions of the shifter bar, and hence of the helical gear 21 along the splined shaft portion 20, since the helical gear is constrained to partake of the axial movement of the shifter bar 22 due to its engagement in the recess 30 on the shifter bar. The latter is actuated in any convenient or conventional manner, the forked end 31 of the bar serving to receive a suitable actuating lever (not shown).

Referring now to Figs. II and III, which show a modified and preferred arrangement for mounting the two-direction thrust bearing the latter consists of the thrust rings 32 secured about the reduced portion 34a of the power take-off shaft 34 and maintained in axially spaced relationship by the ring 35 which encircles the bearing ball members 36 against which the thrust rings operate.

The two-direction thrust bearing thus constituted is confined upon the annular groove formed in part upon the shaft 33, by the radial shoulder 37 and split retaining ring 38, and in part upon the socket extension 39a of the casing end wall 39, by the radial shoulder 40 and retaining ring 41. The latter is secured upon the socket extension 39a by a series of screwed studs 42, which latter also serve for the attachment of a collar 43, as is clearly seen in Fig. II and will be self-understood.

It will be appreciated that in the use of the power take-off apparatus the helical gear is rotated in either one direction or in the reverse direction, depending upon the particular adjusted and indexed position selected, and that the shaft is accordingly subjected to axial thrust exerted in one direction or in the opposite direction. The two-direction axial thrust bearing provided by the present invention serves to withstand such thrusts in an advantageous and efficient manner.

Having thus described my invention, what I desire to claim as new and protect by Letters Patent is:

In a power take-off attachment for automobiles, a hollow casing having opposite side walls with opposed shaft openings therein, said openings each having journal means, a shaft rotatably mounted within said casing by having end portions thereof mounted in said journal means, said shaft having a reduced portion commencing at the point of exit of an end outside extension of the shaft from one said casing side wall and defining a radial shoulder on the shaft coincident with the outside surface of said casing side wall, said shaft having a helical spline portion within the casing and a helical gear wheel on said splined portion, and axial thrust means on said shaft for supporting the shaft against axial thrusts in the rotation of said helical gear wheel, said axial thrust means comprising a pair of axially spaced ring members mounted on said reduced shaft extension, the external diameter of said ring members being larger than the diameter of the corresponding casing shaft opening, bearing elements between said ring members, removable casing structure, and means clamping said casing structure against the outside of said hollow casing in confining relationship to said rings, said casing structure having a bore therethrough, said bore being enlarged in concentric relationship to said reduced shaft extension and defining an internal shoulder in clamping engagement with said bearing ring assembly.

ROBERT W. WAGNER.

REFERENCES CITED

The following references are of record in the file of this patent:

UNITED STATES PATENTS

| Number | Name | Date |
|---|---|---|
| 1,219,921 | Collins, Jr. | Mar. 20, 1917 |
| 1,504,513 | Ruffner | Aug. 12, 1924 |
| 1,505,998 | Ellett | Aug. 26, 1924 |
| 1,832,312 | Lutz | Nov. 17, 1931 |
| 1,922,350 | Bolton | Aug. 15, 1933 |
| 2,100,678 | Wagner | Nov. 30, 1937 |
| 2,162,979 | Simpson | June 20, 1939 |
| 2,205,473 | Fishburn | June 25, 1940 |
| 2,316,503 | Curtis | Apr. 13, 1943 |
| 2,320,960 | Wheaton | June 1, 1943 |